(12) United States Patent
Takahashi et al.

(10) Patent No.: US 7,513,172 B2
(45) Date of Patent: Apr. 7, 2009

(54) TRANSMISSION APPARATUS

(75) Inventors: Yohei Takahashi, Nishio (JP);
Takafumi Yamada, Nishio (JP);
Yasuhiro Nitta, Nagoya (JP); Seiji Usami, Chiryu (JP); Akihiko Ikeda, Nishikamo-gun (JP); Daisuke Ido, Nagoya (JP)

(73) Assignees: Aisin AI Co., Ltd., Nishio-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 350 days.

(21) Appl. No.: 11/448,835

(22) Filed: Jun. 8, 2006

(65) Prior Publication Data
US 2006/0278475 A1  Dec. 14, 2006

(30) Foreign Application Priority Data
Jun. 10, 2005  (JP) ............................ 2005-170659

(51) Int. Cl.
*F16H 57/04* (2006.01)
(52) U.S. Cl. ...................... 74/467; 184/6.12
(58) Field of Classification Search .............. 74/325, 74/329, 331, 467, 468; 475/159, 160; 184/6.12, 184/6.27, 11.1, 11.2, 11.3, 13.1, 65
See application file for complete search history.

(56) References Cited

U.S. PATENT DOCUMENTS

| | | | | |
|---|---|---|---|---|
| 3,618,711 A | * | 11/1971 | Vollmer | 184/6.12 |
| 3,771,622 A | * | 11/1973 | Hyakumura | 184/11.2 |
| 4,231,266 A | * | 11/1980 | Nishikawa et al. | 74/467 |
| 6,595,086 B2 | * | 7/2003 | Kobayashi | 74/665 T |

FOREIGN PATENT DOCUMENTS

| | | | | |
|---|---|---|---|---|
| EP | 373495 A1 | * | 6/1990 | 74/467 |
| JP | 03209047 A | * | 9/1991 | 74/467 |
| JP | 04285356 A | * | 10/1992 | 184/6.12 |
| JP | 2000-240773 A | | 9/2000 | |

* cited by examiner

*Primary Examiner*—Roger Pang
(74) *Attorney, Agent, or Firm*—Buchanan Ingersoll & Rooney PC

(57) ABSTRACT

A transmission apparatus includes a casing provided with shafts therein, a rotational member positioned in the casing at an end portion in an axial direction of the shafts, the rotational member being configured to lift up a lubricating oil so as to supply the lubricating oil to a part that is different from the end portion inside the casing, and an oil passage provided along the axis line direction of the shafts, the oil passage configured to receive the lubricating oil lifted up by the rotational member at a first end portion in a longitudinal direction of the oil passage and to supply the lubricating oil through a second end portion in the longitudinal direction of the oil passage to a part inside the casing placed far away from the rotational member, the oil passage being integrally formed with the casing.

6 Claims, 5 Drawing Sheets

TRANSMISSION APPARATUS

This application is based on and claims priority under 35 U.S.C. § 119 to Japanese Patent Application 2005-170659, filed on Jun. 10, 2005, the entire content of which is incorporated herein by reference.

FIELD OF THE INVENTION

This invention relates to a transmission apparatus, in which lubricating oil is lifted by a rotational member for lubrication, the rotational member being provided in a casing at an end portion in an axis line direction, the casing having a shift gear shaft therein. More particularly, the present invention pertains to a transmission apparatus for a vehicle, which is applicable for a longitudinal-type transaxle incorporating a final reduction gear unit at an end portion in an axis line direction thereof.

BACKGROUND

As a transmission apparatus for a vehicle, generally referred to as a transaxle, which incorporates a final reduction gear unit in a casing thereof, there are two types such as a transverse-type transmission apparatus and a longitudinal-type transmission apparatus. The transverse-type transmission apparatus incorporates the final reduction gear unit parallel to an axis line direction of the transmission apparatus, and the longitudinal-type transmission apparatus incorporates the final reduction gear unit at an end portion in the axis line direction of the transmission apparatus. Illustrated in FIGS. 7-9 is an example of a conventional longitudinal-type transmission apparatus. A casing 101 includes a transmission case 103 and a final reduction gear unit case 102. The transmission case 103 houses, therein, shift gear shafts such as an input shaft 120 and an intermediate shaft 121 arranged in parallel to each other, and drive side shift gears (hereinafter, referred to as drive gears) 122a-127a and driven side shift gears (hereinafter, referred to as driven gears) 122b-127b. The drive gears 122a-127a are respectively mounted on the shift gear shaft 120, while the driven gears 122b-127b are respectively mounted on the intermediate gears 121, which all are selectively operated by selector sleeves 128-130. The final reduction gear unit case 102 is provided at an end portion in an axis line direction of the transmission case 103 for housing, therein, a final reduction gear unit 135. According to the example illustrated in FIGS. 7-9, the transmission case 103 includes a middle part case 103a and a front part case 103b. The final reduction gear unit case 102, the middle part case 103a, and the front part case 103b are integrally connected to one another in such a manner that the middle part case 103a is interposed between the final reduction gear unit case 102 and the front part case 103b.

A first end portion of the shift gear shaft 120 is supported, through a rolling bearing, at an end wall 103k of the front part case 103b, and a second end portion of the shift gear shaft 120 is supported, through a rolling bearing, at a boss portion 102e formed on a dividing wall 102a of the final reduction gear unit case 102. A first end portion of the intermediate shaft 121 is supported, through a rolling bearing, at the end wall 103k of the front part case 103b, and a second end portion of the intermediate shaft 121 is supported, through a rolling bearing, at a boss portion 102d formed on the dividing wall 102a of the final reduction gear unit case 102. Further, middle portion of the shift gear shafts 120 and 121 are supported, through rolling bearings, at a transmission chamber dividing wall 103c of the middle part case 103a. The casing 101 includes a final reduction chamber 101A in the final reduction gear unit case 102, and includes a transmission chamber 101B between the dividing wall 102a of the final reduction gear unit case 102 and the transmission case 103. The transmission chamber 100B is divided into a middle part transmission chamber 101B1 and a front part transmission chamber 101B2 by means of the transmission chamber dividing wall 103c. The shift gears 126a, 127a, 126b, and 127b and the selector sleeve 130 are placed in the middle part transmission chamber 101B1, and the shift gears 122a-125a and 122b-125b and the selector sleeves 28 and 29 are placed in the front part transmission chamber 101B. As illustrated in FIGS. 7 and 9, a first oil pool 114 shaped as a half circular arc is provided at a lower part of the middle part transmission chamber 101B1 and covers a lower side of the shift gears 126b and 127b by leaving some space. The first oil pool 114 is supported with its first end fixed to a half circular arc shaped flange portion 103d, which protrudes toward an inside of the middle part transmission chamber 101B1, and its second end fixed to an end surface of the final reduction gear unit case 102. A second oil pool 115, being a half circular arc, is provided at a lower part of the front part transmission chamber 101B2 and covers a lower side of the shift gears 122b-125b in the same manner as the second oil pool 114. The first end of the input shaft 120 is protruded toward an outside of the transmission case 103 through the end wall 103k and the second end of the input shaft 120 is protruded toward an inside of the final reduction chamber 101A through the dividing wall 102a.

The final reduction gear unit 135 is mainly configured with a drive pinion 136 and a ring gear 137. The drive pinion 136 is provided at the second end of the intermediate shaft 121, which protrudes toward the inside of the final reduction chamber 101A, and the ring gear 137 is supported inside the final reduction gear unit case 102 and gear-meshes with the drive pinion 136 so that the ring gear 137 is freely rotatable about an axis line extending perpendicular to the intermediate shaft 121. A differential gear mechanism (not shown), provided at the ring gear 137, includes an output shaft 138 which projects in a width direction of the vehicle or perpendicularly to the sheet of FIG. 1 and coaxially with the ring gear 37 so as to drive vehicle wheels.

As can be seen from FIG. 8, an inlet opening 102b is formed at an upper part of the dividing wall 102a of the final reduction gear unit case 102, and a feedback opening 102c is formed at a lower part of the dividing wall 102a. The inlet opening 102b is positioned in an eccentric manner relative to the intermediate shaft 121 in the vicinity of a rotational surface of the ring gear 137. As can be seen from FIG. 9, three openings 103e-103g are vertically provided at the transmission chamber dividing wall 103c of the middle part case 103a. The openings 103e-103g are positioned in an eccentric manner relative to the intermediate shaft 121, to approximately correspond to the inlet opening 102b. Further, an opening 103h is also formed at the transmission chamber dividing wall 103c. The opening 103h is placed at an outer side of the flange portion 103d and is placed at a higher level than a bottom surface of the front part transmission chamber 101B2.

With the configuration of the above described conventional transmission apparatus, the lubricating oil stored at a lower part of the final reduction chamber 101A, i.e., the lowest part inside the casing 101, is lifted up by means of the ring gear 137 as indicated by an arrow F1 shown in FIG. 7 and the lubricating oil is supplied into the transmission chamber 101B through the inlet opening 102b of the dividing wall 102a as indicated by an arrow F6 shown in FIG. 7. Most part of the lubricating oil flows into the transmission chamber 101B then falls into the middle part transmission chamber 101B1, as indicated by an arrow F7 shown in FIG. 7, and the rest of the lubricating oil falls into the front part transmission chamber 101B2 through the openings 103e-103g, formed at the transmission chamber dividing wall 103c, as indicated by arrows F8 and F9 shown in FIG. 7. Accordingly, the lubricating oil lubricates meshing surfaces and sliding surfaces of the shift gears 22a-27a and 22b-27b and the selector sleeves 128-130. Further, the meshing surfaces and the sliding surfaces are also lubricated by means of the lubricating oil, which flows into the first and second oil pools 114 and 115 and is lifted up by means of the shift gears 122b-127b.

Because the lubricating oil, stored at the lower part inside the final reduction chamber 101A, is lifted up by means of the ring gear 137, an oil level of the lubricating oil in the final reduction chamber 101A is lowered. Therefore, the lubricating oil in the middle part transmission chamber 101B1 is fed back to the final reduction chamber 101A through the feedback opening 102c as indicated by an arrow F5 shown in FIG. 7, and the lubricating oil in the front part transmission chamber 101B2 is fed back to the final reduction chamber 101A from the opening 3h, through the middle part transmission chamber 101B1, as indicated by an arrow F4 shown in FIG. 7. Accordingly, the lubricating oil is circulated among the final reduction chamber 101A, the middle part transmission chamber 101B1, and the front part transmission chamber 101B2. On this occasion, because the ring gear 137 is transmitted with the largest torque, a heat release value at the ring gear 137 is increased, and temperature of the lubricating oil in the final reduction chamber 101A is raised. The high-temperature lubricating oil is cooled by means of the transmission case 103 during lubrication in the middle part transmission chamber 101B1 and the front part transmission chamber 101B2, and then the lubricating oil is fed back to the final reduction gear unit case 102. Further, heat transmitted to the transmission case 103 from the high-temperature lubricating oil is discharged from an outer surface thereof and the transmission case 103 is thereby cooled.

However, with the configuration of such lifting-up type lubricating device, if the oil level of the lubricating oil in the chambers 101A, 101B1, and/or 101B2 fluctuate respectively due to vehicle driving conditions such as climbing and descending conditions, a longitudinal acceleration, a turning acceleration, or the like, there may be a lack of lubrication in a chamber in which the oil level of the lubricating oil is lowered. Thus, a possibility of causing an increase in abrasion of the meshing surface and the sliding surface or a seizure of the meshing surface and the sliding surface may occur. In view of the above mentioned considerations, the aforementioned transmission apparatus is provided with the opening 103h, formed at the transmission chamber dividing wall 103c, at the higher level than the bottom surface of the front part transmission chamber 101B2, for preventing a lowering of the oil level of the lubricating oil in the cambers 101A, 101B1, and/or 101B2 (especially in the front part transmission chamber 101B2) regardless of the climbing and descending conditions, the longitudinal acceleration, the turning acceleration, or the like, of the vehicle.

A method for evenly feeding the lubricating oil to the meshing surface and the sliding surface of the shift gears in the transmission case is disclosed in JP2000-240773A (see paragraphs [0037], and [0047]-[0048], and FIGS. 6 and 13). The transmission apparatus disclosed in JP2000-240773A includes a shower pipe, provided between an input shaft of shift gears, and an output shaft of shift gears, the shower pipe being parallel to the input and output shafts. Both ends of the shower pipe are supported by a casing and by a component fixed at the casing. Some of the lubricating oil discharged from an oil pressure pump is supplied to the shower pipe, and the lubricating oil is discharged from plural discharge openings provided at the side of the shower pipe to lubricate components (especially meshing portion of the gear) provided at the input and output shafts.

With the configuration of the conventional transmission apparatus illustrated in FIGS. 7-9, because the openings 103e-103g, formed at the transmission chamber dividing wall 103c, are required to avoid contact with boss portions or a reinforcing rib, which all support the shift gear shafts 120 and 121, a dimension and an arrangement of the openings 103e-103g are limited. Therefore, an amount of the lubricating oil, to be supplied into the front part transmission chamber 101B2 through the openings 103e-103g out of the lubricating oil which is lifted up from the lower part of the final reduction chamber 101A by means of the ring gear 137, and supplied into the transmission chamber 101B through the inlet opening 102b, may occasionally be insufficient. More specifically, the amount of the lubricating oil feeding into the front part transmission chamber 101B2 through the openings 103e-103g is decreased especially at the time of low speed driving, for example in a climbing condition. On this occasion, because the level of the lubricating oil in the front part transmission chamber 101B2 is lowered, an amount of the lubricating oil lifted up by means of the shift gears 22b-25b is decreased. In consequence, there is a lack of lubrication of the meshing surface and the sliding surface of the shift gears 22a-25a and 22b-25b and the selector sleeves 128 and 129, and the possibility of causing the increase of the abrasion of the meshing surface and the sliding surface or the seizure of the meshing surface and the sliding surface may increase. Further, in a condition where an amount of the lubricating oil supplied into the front part transmission chamber 101B2 is decreased, an amount of the lubricating oil circulating through the front part transmission chamber 101B2 is decreased, and heat discharged from the outer surface of the front part case 103b is decreased to some degree. Therefore, the temperature of the lubricating oil in the final reduction chamber 101A is raised. For reasons mentioned above, the lubricating oil is deteriorated, and an oil film of the meshing surface and the sliding surface lacks in a condition where a high-load engine torque is applied. In consequence, possibility of an early-stage abrasion or seizure of the meshing surface and the sliding surface may increase.

The above mentioned considerations may occur not only in a condition where the transmission chamber 101B is divided into the middle part transmission chamber 101B1 and the front part transmission chamber 101B2 as illustrated in FIGS. 7-9, but also in a condition where the transmission chamber 101B is a single chamber. More specifically, among from the total amount of the lubricating oil, which is lifted up from the lower part of the final reduction chamber 101A by the ring gear 137 and is supplied into the transmission chamber 101B, an amount of the lubricating oil, which can reach to a part placed far away from the ring gear 137, may be insufficient. Further, the amount of the lubricating oil supplied into the front part transmission chamber 101B2 through the openings 103e-103g is decreased especially at the time of low speed driving, for example in a condition of climbing. Therefore, the lubrication of the meshing surface and the sliding surface of the shift gears and the selector sleeves, the shift gears and the selector sleeves placed far away from the ring gear 137, lacks. In consequence, a possibility of causing the increase in the abrasion of the meshing surface and the sliding surface or the seizure of the meshing surface and the sliding surface may increase. Moreover, because the amount of the lubricating oil circulating through the part placed far away from the ring gear 137 is decreased, heat discharged from an outer surface of a part of the casing 101 placed far away from the ring gear 137 is decreased, and the temperature of the lubricating oil in the final reduction chamber 101A is raised. Thereby, the lubricating oil is deteriorated, and the oil film of the meshing surface and the sliding surface lacks in a condition where the high-load engine torque is applied. In consequence, a possibility of the early-stage abrasion or seizure of the meshing surface and the sliding surface may increase.

Fluctuation in an oil level of the lubricating oil in the chambers 101A, 101B1, and 101B2 due to the climbing and descending conditions, the longitudinal acceleration, or the like of the vehicle, in a condition where the transmission chamber 101B is divided into the middle part transmission chamber 101B1 and the front part transmission chamber 101B2, can be controlled to some extent by raising a position of the opening 103h of the transmission chamber dividing wall 103c. However, if the opening 103h is provided at a higher position, it may be possible that a good amount of the lubricating oil remains in the front part transmission chamber 101B2, at the time of a replacement of the lubricating oil in the casing 101. The aforementioned considerations may be avoided by providing an oil drain opening at a bottom portion of the front part transmission chamber 101B2, which can be opened and closed by means of a plug. However, a manufacturing cost, the number of components, and weight of the transmission apparatus may therefore increase. Further, some of the conventional transmission apparatuses of this type include plural openings 103j in the vicinity of a bottom surface of the transmission chamber dividing wall 103c as indicated by a chain double-dashed line shown in FIG. 9 for avoiding any possible inconvenience at the time of replacement of the lubricating oil. However, the transmission apparatus with the plural openings 103j cannot control a lowering of the lubricating oil in the front part transmission chamber 101B2.

According to the method, disclosed in JP2000-240773A, for evenly feeding the lubricating oil to the meshing surface and the sliding surface of the shift gears, the transmission apparatus requires the shower pipe, supporting members, for supporting the shower pipe to the casing, and the oil pressure pump, for feeding the lubricating oil. Therefore, the number of the components and weight of the transmission apparatus may increase.

The present invention has been made in view of the above circumstances, and provides a transmission apparatus which reliably supplies lubricating oil to a part placed far away from a rotational member without increasing a manufacturing cost, the number of components, weight, or the like.

SUMMARY OF THE INVENTION

According to an aspect of the present invention, a transmission apparatus includes a casing provided with shafts therein, a rotational member positioned in the casing at an end portion in an axial direction of the shafts, the rotational member being configured to lift up a lubricating oil so as to supply the lubricating oil to a part that is different from the end portion inside the casing, and an oil passage provided along the axis line direction of the shafts, the oil passage configured to receive the lubricating oil lifted up by the rotational member at a first end portion in a longitudinal direction of the oil passage and to supply the lubricating oil through a second end portion in the longitudinal direction of the oil passage to a part inside the casing placed far away from the rotational member, the oil passage being integrally formed with the casing.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
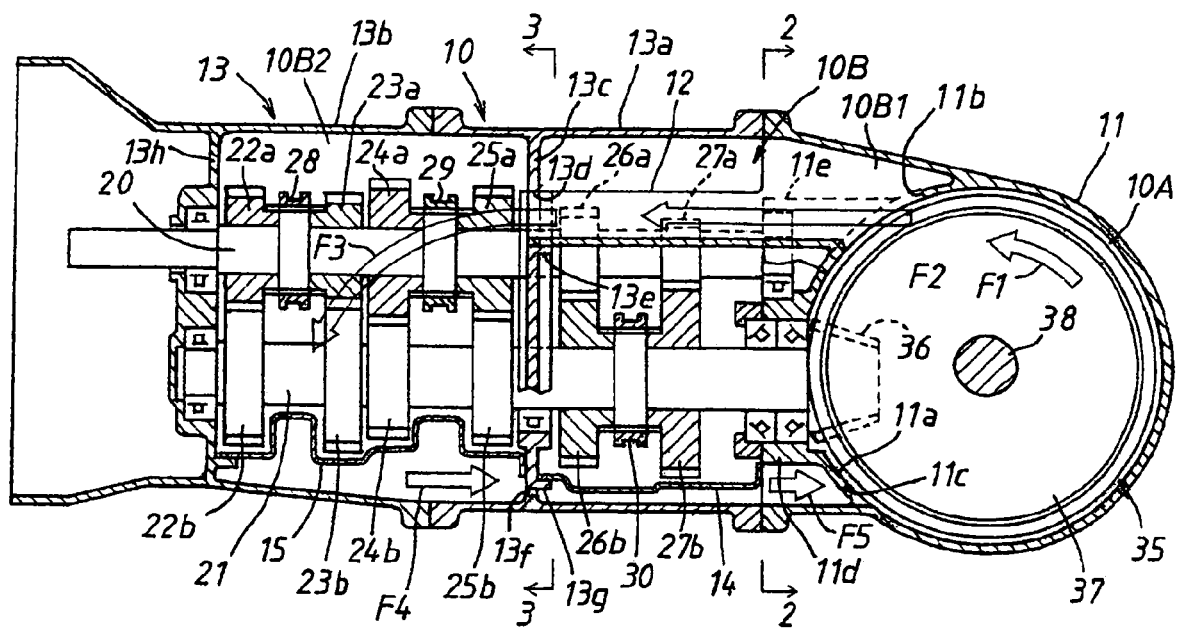
FIG. 1 is a longitudinal sectional view illustrating a whole structure of a transmission apparatus according to an embodiment of the present invention.
Figure 2:
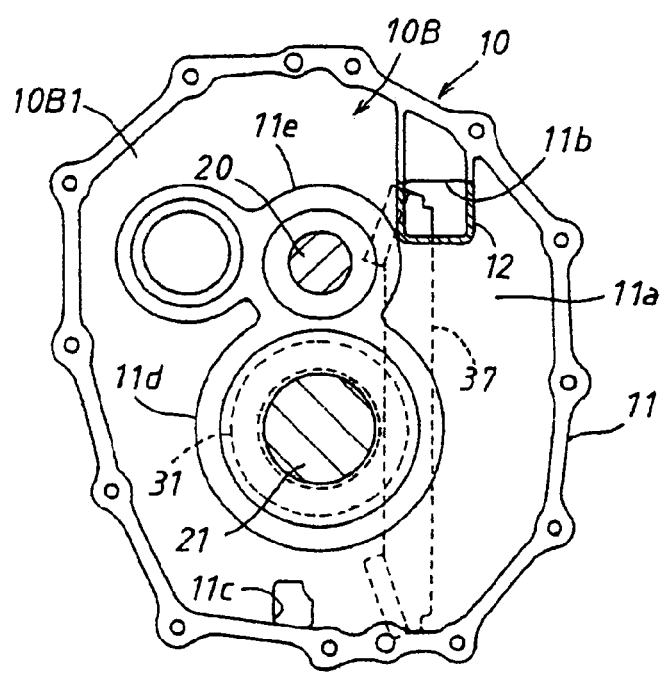
FIG. 2 is a sectional view taken along line II-II of FIG. 1.

An embodiment of the present invention applicable for a longitudinal-type transaxle will be explained hereinbelow with reference to FIGS. 1-4. As illustrated in FIG. 1, a casing 10 of a transmission apparatus includes a transmission case 13, in which shift gear shafts (i.e., shafts) 20 and 21 are arranged parallel with each other, and a final reduction gear unit case 11 provided at an end portion in the axis line direction of the transmission case 13, are provided The transmission case 13 includes a middle part case 13a and a front part case 13b. The final reduction gear unit case 11, the middle part case 13a, and the front part case 13b are integrally connected to one another in such a manner that the middle part case 13a is sandwiched by the final reduction gear unit case 11 and the front part case 13b.

The shift gear shafts 20 and 21 include an input shaft 20 and an intermediate shaft 21. A first end portion of the shift gear shaft 20 is supported through a rolling bearing, at an end wall 13h of the front part case 13b, and a second end portion of the shift gear shaft 20 is supported, through a rolling bearing, at a boss portion 11e formed on a dividing wall 11a of the final reduction gear unit case 11. A first end portion of the shift gear shaft 21 is supported, through a rolling bearing, at an end wall 13h of the front part case 13b, and a second end portion of the shift gear shaft 21 is supported, through a rolling bearing, at a boss portion 11d formed on the dividing wall 11a of the final reduction gear unit case 11. Further, middle portion of the shift gear shafts 20 and 21 are supported, through rolling bearings, at a transmission chamber dividing wall 13c of the middle part case 13a. The casing 10 includes a final reduction chamber 10A in the final reduction gear unit case 11, which is defined by the dividing wall 11a, and includes a transmission chamber 10B, which is defined by the dividing wall 11a and the transmission case 13. The transmission chamber 10B is divided into a middle part transmission chamber 10B1 and a front part transmission chamber 10B2, by the transmission chamber dividing wall 13c.

Drive gears 26a and 27a, integrally provided at the input shaft 20, and driven gears 26b and 27b, rotatably provided at the intermediate shaft 21, are provided in the middle part transmission chamber 10B1. The drive gear 26a is normally meshed with the driven gear 26b, and the drive gear 27a is normally meshed with the driven gear 27b. The driven gears 26b and 27b are selectively connected to the intermediate shaft 21 by means of a selector sleeve 30 for establishing a predetermined shift stage. The selector sleeve 30 is spline-engaged with a clutch hub, which is integrally provided at the intermediate shaft 21 between the driven gears 26b and 27b, the selector sleeve 30 being slidable in an axis line direction of the intermediate shaft 21. In the front part transmission chamber 10B2, provided are drive gears 22a-25a, which are rotatably provided at the input shaft 20, and driven gears 22b-25b which are integrally provided at the intermediate shaft 21. The drive gear 22a is normally meshed with the driven gear 22b, the drive gear 23a is normally meshed with the driven gear 23b, the drive gear 24a is normally meshed with the driven gear 24b, and the drive gear 25a is normally meshed with the driven gear 25b. The drive gears 22a and 23a are selectively connected to the input shaft 20 by means of a selector sleeve 28 for establishing a predetermined shift stage. The selector sleeve 28 is spline-engaged with a clutch hub, which is integrally provided at the input shaft 20 between the drive gears 22a and 23a, the selector sleeve 28 being slidable in an axis line direction of the input shaft 20. The drive gears 24a and 25a are selectively connected to the input shaft 20 by means of a selector sleeve 29 for establishing a predetermined shift stage. The selector sleeve 29 is spline-engaged with a clutch hub, which is integrally provided at the input shaft 20 between the drive gears 24a and 25a, the selector sleeve 29 being slidable in the axis line direction of the input shaft 20.

As illustrated in FIG. 1, a first oil pool 14 is provided at a lower part of the middle part transmission chamber 10B1 and covers a lower side of the shift gears 26b and 27b. Further, a second oil pool 15 is provided at a lower part of the front part transmission chamber 10B2 and covers a lower side of the shift gears 22b-25b. A final reduction gear unit 35, provided in the final reduction chamber 10A, includes a ring gear 37 (i.e., a rotational member), supported in the final reduction gear unit case 11, and a drive pinion 36, provided at an end portion of the intermediate shaft 21 protruding toward an inside of the final reduction chamber 10A. The ring gear 37 is rotatable about an axis line perpendicular to the intermediate shaft 21 and is meshed with the drive pinion 36. A differential gear mechanism (not shown), provided at the ring gear 37, includes an output shaft 38 which is coaxially provided with the ring gear 37 and extending in a width direction of the vehicle for driving wheels.

Figure 3:
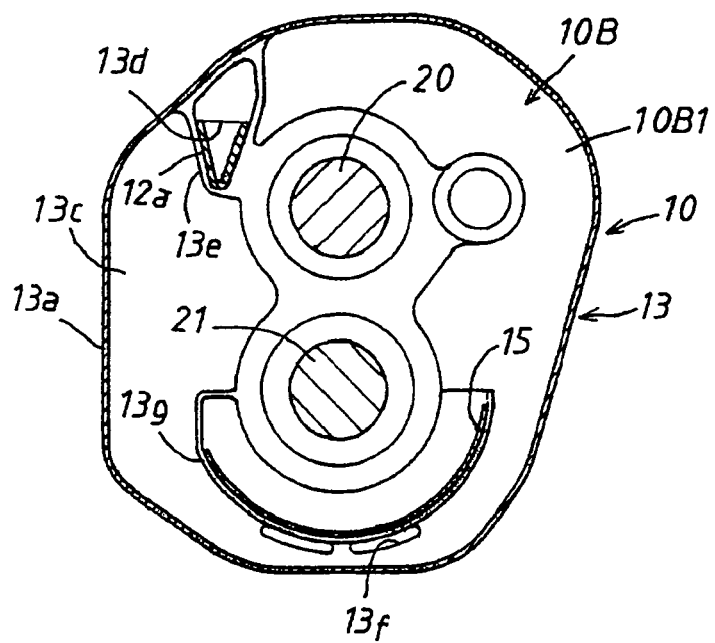
FIG. 3 is a sectional view taken along line III-III of FIG. 1.
Figure 4:
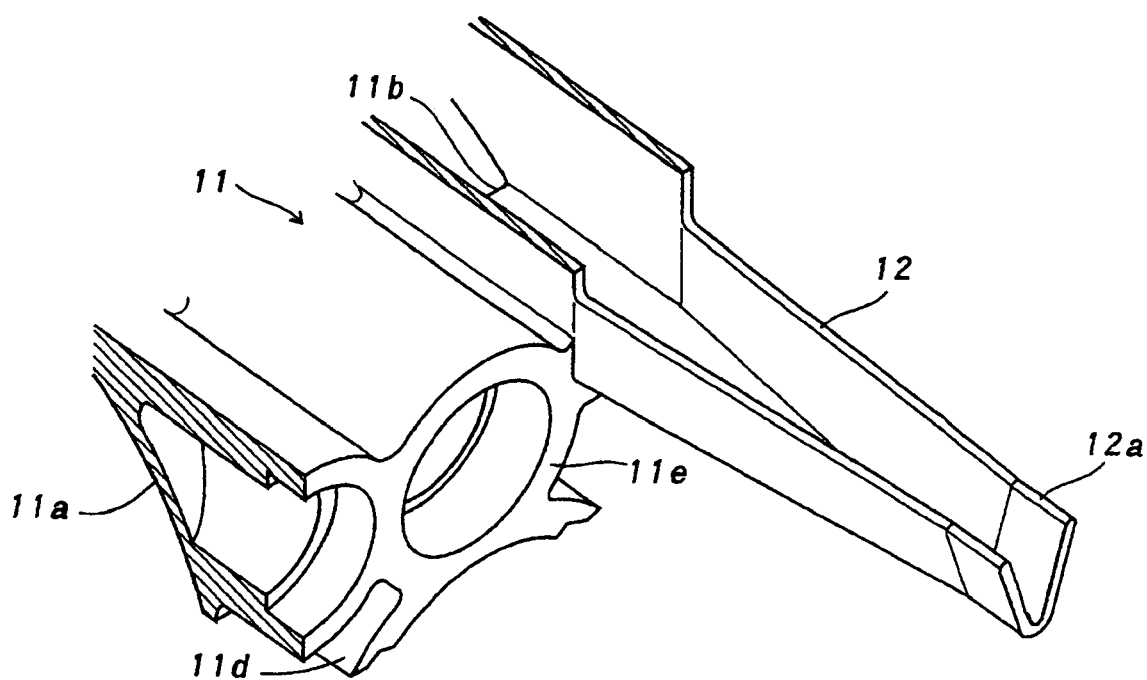
FIG. 4 is an enlarged partial view illustrating the vicinity of an oil passage according to the embodiment illustrated in FIG. 1.

As illustrated in FIGS. 1-4, an inlet opening 11b is formed at an upper part of the dividing wall 11a of the final reduction gear unit case 11 and a feedback opening 11c is formed at a lower part of the dividing wall 11a of the final reduction gear unit case 11. The inlet opening 11b is eccentrically provided relative to the intermediate shaft 21 in the vicinity of a rotational surface of the ring gear 37. An oil passage 12 is integrally connected to the final reduction gear unit case 11 and is extending parallel to the shift gear shafts 20 and 21. The oil passage 12 includes a substantial groove shape, which opens upward. An end portion 12a of the oil passage 12 is inserted to, and supported by, an opening 13d formed at the transmission chamber dividing wall 13c of the middle part case 13a. The opening 13d being a substantial V-shape includes a flange portion 13e as illustrated in FIG. 3. With reference to FIG. 4, a part of the oil passage 12 positioned at the inlet opening 11b side includes a substantially U-shaped cross-section, and the end portion 12a of the oil passage 12 to be inserted into the opening 13d includes a substantially V-shaped cross-section. Further, a middle part of the oil passage 12 is gradually changed from U-shape to V-shape.

As illustrated in FIGS. 1 and 3, a flange portion 13g, provided at a lower part of the transmission chamber dividing wall 13c of the middle part case 13a, is protruded toward an inside of the middle part transmission chamber 10B1. The flange portion 13g is short and is formed into a substantial half circular arc centering the intermediate shaft 21. An end portion of the first oil pool 14 is supported at the flange portion 13g. At a lower end part of the transmission chamber dividing wall 13c, formed are two lower side openings 13f along a lower side of the flange portion 13g. The substantial arc-shaped lower side openings 13f are short and narrow.

The input shaft 20 is rotary operated by means of an engine by connecting an end portion of the input shaft 20, protruding from the end wall 13h of the front part case 13b, to the engine. The lubricating oil stored at a lower part of the final reduction chamber 10A, i.e. the lowest part of the casing 10, is lifted up by means of the ring gear 37 as indicated by an arrow F1 shown in FIG. 1. Further, as indicated by arrows F2 and F3 shown in FIG. 1, the lubricating oil lifted up by means of the ring gear 37 is supplied to the oil passage 12 at a first end portion in a longitudinal direction thereof, the first end portion being integrally connected to the inlet opening 11b of the dividing wall 11a. Then, the lubricating oil is supplied into the transmission chamber 10B from a second end portion in the longitudinal direction thereof (i.e., the end portion 12a), the second end portion being inserted and supported at the opening 13d of the middle part case 13a. Although, some of the lubricating oil is overflowed from upper edges in a width direction of the oil passage 12 and falls into the middle part transmission chamber 10B1, most of the lubricating oil is reliably supplied into the front part transmission chamber 10B2 through the oil passage 12 as indicated by the arrow F3 shown in FIG. 1 and lubricates meshing surfaces and sliding surfaces of the shift gears 22a-25a and 22b-25b and the selector sleeves 28 and 29. The meshing surface and the sliding surface are also lubricated by means of the lubricating oil, which is flowed into the second oil pool 15 and lifted up by means of the lower shift gears 22b-25b. As indicated by an arrow F4 shown in FIG. 1, the lubricating oil supplied into the front part transmission chamber 10B2 and stored at the lower part of the front part transmission chamber 10B2 is fed into the lower part of the middle part transmission chamber 10B1 through the lower side opening 13f formed at the lower end part of the transmission chamber dividing wall 13c. Then, as indicated by an arrow F5 shown in FIG. 1, the lubricating oil is fed back to the final reduction chamber 10A through the feedback opening 11c, formed at the lower part of the dividing wall 11a of the final reduction gear unit case 11. According to the embodiment of the present invention, a dimension, e.g., an opening area, of the lower side opening 13f formed at the lower end part of the transmission chamber dividing wall 13c is appropriately narrowed down. Therefore, during normal operation, a level of the lubricating oil, required for lubricating the shift gears 22a-25a and 22b-25b and the selector sleeves 28 and 29 placed in the front part transmission chamber 10B2, is kept or attained by the lubricating oil, supplied into the front part transmission chamber 10B2 from the oil passage 12.

The lubricating oil, overflowed from upper edges in the width direction of the oil passage 12, falls into the middle part transmission chamber 10B1, and lubricates meshing surfaces and sliding surfaces of the shift gears 26a, 27a, 26b and 27b and the selector sleeve 30. The meshing surface and the sliding surface are also lubricated by means of the lubricating oil, which flows into the first oil pool 14 and which is lifted up by means of the shift gears 26*b* and 27*b*. The lubricating oil fallen from the oil passage 12 and the lubricating oil supplied into the middle part transmission chamber 10B1 from the front part transmission chamber 10B2, through the lower side opening 13*f*, is fed back to the final reduction chamber 10A through the feedback opening 11*c* formed at the lower part of the dividing wall 11*a* of the final reduction gear unit case 11 as indicated by the arrow F5 shown in FIG. 1. According to the embodiment of the present invention, a dimension e.g., an opening area of the feedback opening 11*c*, formed at the lower part of the dividing wall 11*a*, is appropriately narrowed down. Therefore, during normal operation, a level of the lubricating oil required for lubricating the shift gears 26*a*, 27*a*, 26*b* and 27*b* and the selector sleeve 30 is kept by means of the lubricating oil supplied into the middle part transmission chamber 10B1. The first and second oil pools 14 and 15 are formed with plural holes having an appropriate size so that an appropriate amount of the lubricating oil can be lifted up in such a manner that the lubricating oil is supplied to shift gears 22*b*-27*b*.

An oil drain opening (not shown) closed by means of a screw plug, is provided at the lower part of the final reduction chamber 10A, i.e., at the lowest part of the casing 10. According to the embodiment of the present invention, the dimensions of the feedback opening 11*c*, formed at the dividing wall 11*a*, and the lower side opening 13*f*, formed at the transmission chamber dividing wall 13*c*, are narrowed. However, because the feedback opening 11*c* and the lower side opening 13*f* are formed at the lower end part of each wall, the lubricating oil in the front part transmission chamber 10B2 can be completely drained through the lower side opening 13*f* by pulling out the plug from the oil drain opening although it may take some time.

According to the embodiment of the present invention, the casing 10 is divided into the final reduction chamber 10A, the middle part transmission chamber 10B1 and the front part transmission chamber 10B2 along an axis line direction of the shift gear shafts 20 and 21. The lubricating oil lifted up by means of the ring gear 37 is supplied into the front part transmission chamber 10B2 placed far away from the ring gear 37 through the oil passage 12 for lubricating the shift gears 22*a*-25*a* and 22*b*-25*b* and the selector sleeves 28 and 29. Accordingly, the lubricating oil, lifted up by means of the ring gear 37 from a bottom portion of the final reduction chamber 10A, is reliably supplied into the front part transmission chamber 10B2 through the oil passage 12, provided along the axis line direction of the shift gear shafts 20 and 21, regardless of an operating condition of the transmission apparatus. Therefore, the shift gears 22*a*-25*a* and 22*b*-25*b* and the selector sleeves 28 and 29, provided in the front part transmission chamber 10B2 and placed far away from the ring gear 37, are sufficiently lubricated and a possibility of causing an increase of abrasion of the meshing surface and the sliding surface or a seizure of the meshing surface and the sliding surface, because of a poor lubrication, can be prevented. Further, because the lubricating oil circulates in the transmission chamber 10B from the front part transmission chamber 10B2 through the middle part transmission chamber 10B1, heat is discharged from a whole surface of the casing 10, and a heat release value is thereby increased. Therefore, temperature of the lubricating oil is lowered and a deterioration of the lubricating oil, because of an increase of oil temperature, can be reduced. In consequence, because a lack of an oil film of the meshing surface and the sliding surface, in a condition where a high-load engine torque is applied, can be prevented, possibility of causing an early-stage abrasion or seizure of the meshing surface and the sliding surface can be reduced. Further, because the oil passage 12 is integrally formed with the casing 10, the oil pressure pump is not required. Therefore, structure of the transmission apparatus can be simplified and possibility of causing an increase of the number of components or an increase of weight can be prevented. However, the present invention is not limited thereto. Alternatively, or in addition, the lubricating oil may be supplied to a part of the casing 10 placed far away from the ring gear 37 through the oil passage 12 along the axis line direction of the shift gear shafts 20 and 21 without dividing the casing 10 into plural chambers. In a condition where the casing 10 includes a single chamber, similar or same effects as described above can also be obtained.

According to the embodiment of the present invention, the lubricating oil for lubrication is lifted up from the bottom portion of the final reduction chamber 10A by means of the ring gear 37 of the final reduction gear unit 35. On this occasion, because the ring gear 37 is transmitted with the largest torque, a heat release value at the ring gear 37 is increased, and temperature of the lubricating oil in the final reduction chamber 10A is raised. The high-temperature lubricating oil is cooled during circulation in the transmission case 13 by discharging the heat from an outer circumferential surface of the transmission case 13, and the lubricating oil is thereby cooled efficiently. However, the present invention is not limited thereto. Alternatively, or in addition, the lubricating oil for lubrication may be lifted up by means of a rotational member instead of the ring gear 37 of the final reduction gear unit 35. With such variation, similar or same effects as described above can also be obtained. More particularly, the part of the casing placed far away from the rotational member is sufficiently lubricated and cooled, and possibility of causing the increase of the abrasion of the meshing surface and the sliding surface or the seizure of the meshing surface and the sliding surface, because of the poor lubrication, can be prevented.

Figure 7:
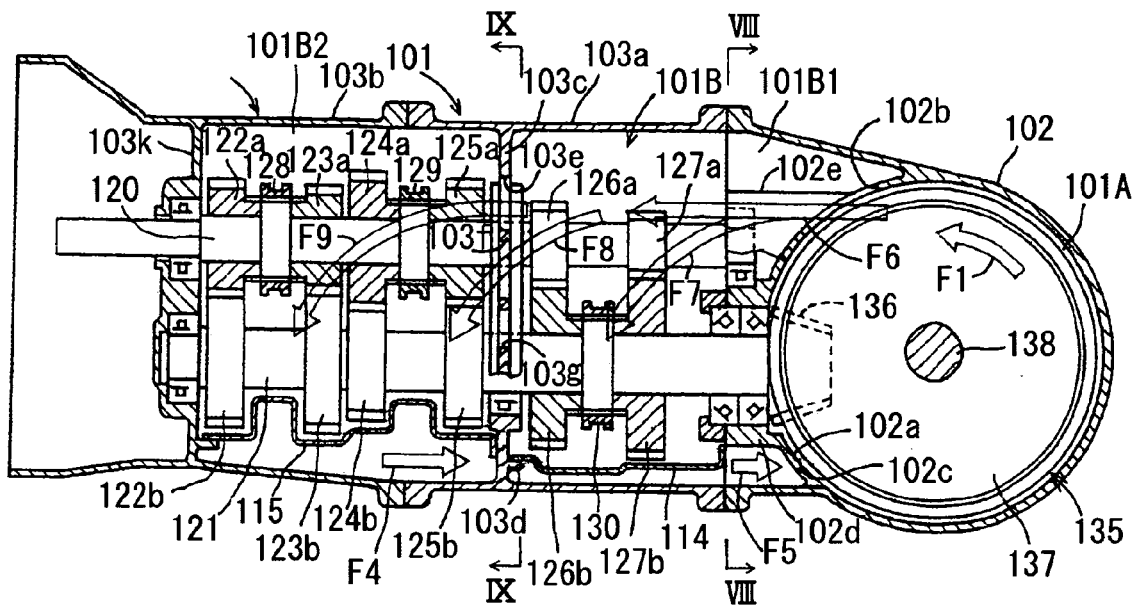
FIG. 7 is a longitudinal sectional view illustrating a whole structure of a transmission apparatus according to a related art.
Figure 8:
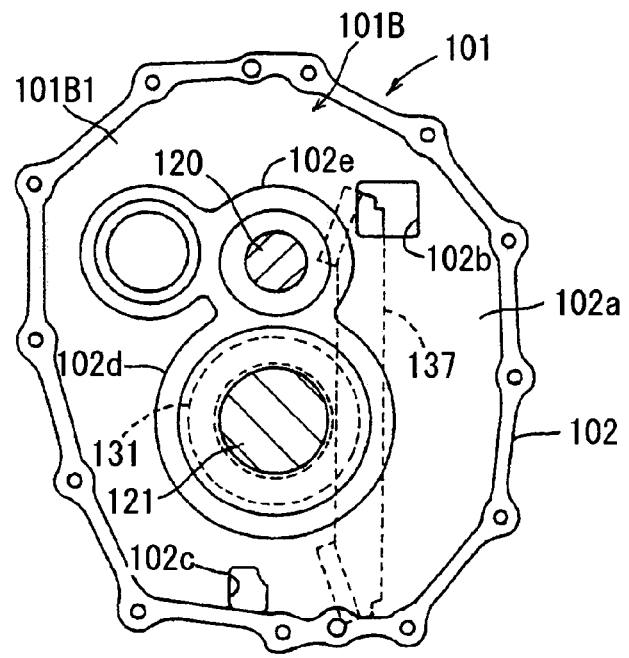
FIG. 8 is a sectional view taken along line VIII-VIII of FIG. 7.
Figure 9:
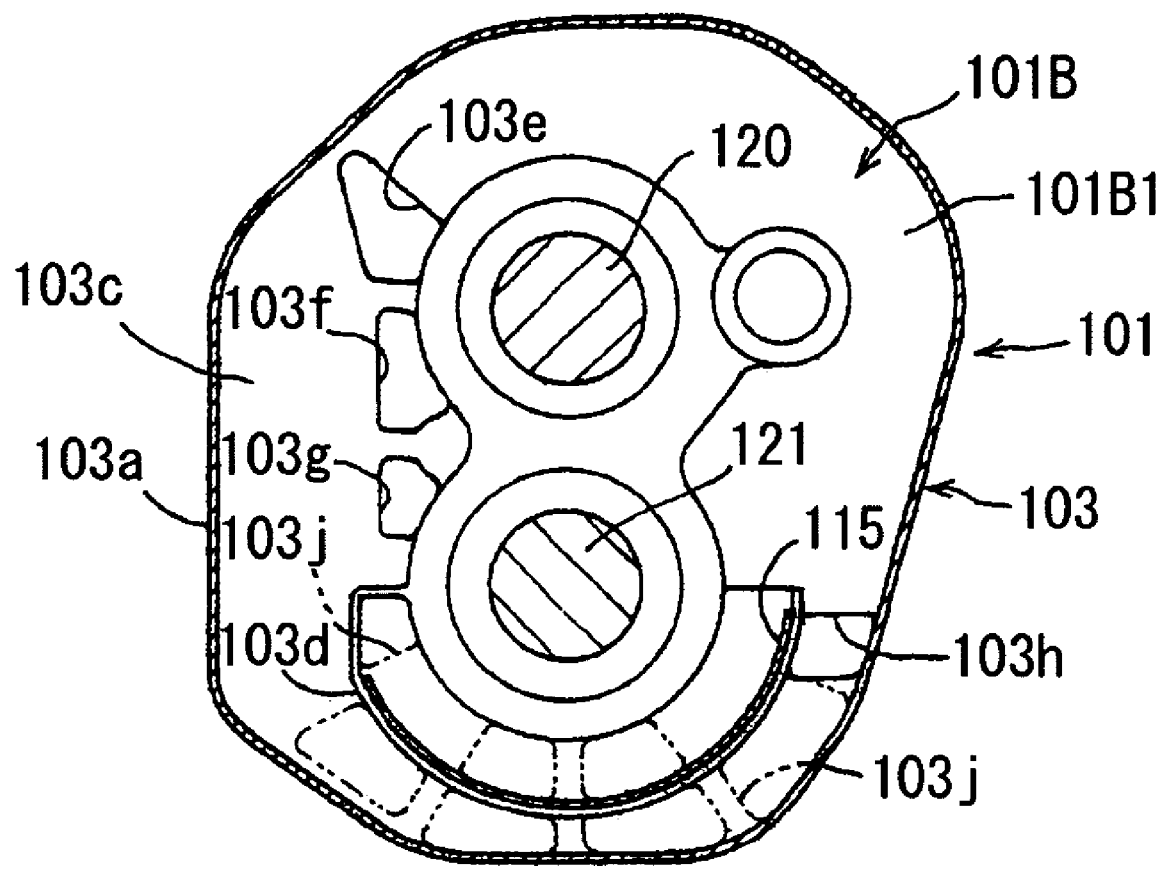
FIG. 9 is a sectional view taken along line IX-IX of FIG. 7.

With the configuration of such lifting-up type lubricating device, if the casing 10 includes a single chamber or if lower parts of divided chambers of the casing 10 communicate with each other, fluctuation in the oil level of the lubricating oil in the casing is generated in a condition of climbing and descending, a longitudinal acceleration, or the like, of the vehicle. Then, lack of lubrication, at a part in which the level of the lubricating oil is lowered, and the possibility of causing the increase of the abrasion of the meshing surface and the sliding surface or the seizure of the meshing surface and the sliding surface, may occur. However, according to the embodiment of the present invention, the casing 10 is divided into the final reduction chamber 10A, the middle part transmission chamber 10B1, and the front part transmission chamber 10B2 along the axis line direction of the shift gear shafts 20 and 21 by means of the dividing wall 11*a* and the transmission chamber dividing wall 13*c*. Further, because the lower side opening 13*f*, formed at the lower end part of the transmission chamber dividing wall 13*c*, and the feedback opening 11*c*, formed at the lower part of the dividing wall 11*a*, are narrowed down in such a manner that the lubricating oil for lubricating each chamber is kept at a level required for lubrication in each chamber, a large amount of the lubricating oil may not move within each chamber in a short period of time. Therefore, although fluctuation in the oil level of the lubricating oil in each chamber is generated in a condition of the climbing and descending, the longitudinal acceleration, or the like, of the vehicle, fluctuation in the oil level of the lubricating oil in the whole casing 10 may not be generated. Thus, the increase of the abrasion of the meshing surface and the sliding surface, or the seizure of the meshing surface and the sliding surface, may much less likely occur because of the poor lubrication at the part in which the level of the lubricating oil is lowered. Further, if there is any possibility of causing fluctuation in the oil level of the lubricating oil in the whole casing 10 because of the lubricating oil moved within each chamber, in a condition of the climbing and descending, the longitudinal acceleration, or the like, of the vehicle, the dimension of the lower side opening 13f and the feedback opening 11c may be further narrowed down for restricting a movement of the lubricating oil among each chamber. Moreover, in such a condition, an opening corresponding to the opening 103h of the related art illustrated in FIGS. 7-9 may be provided at the transmission chamber dividing wall 13c at a position higher than a bottom surface of the front part transmission chamber 10B2.

According to the embodiment of the present invention, the oil passage 12 is integrally connected to the final reduction gear unit case 11 at an outer circumferential portion of the inlet opening 11b, and extending parallel to the shift gear shafts 20 and 21. Further, the end portion 12a of the oil passage 12 is inserted and supported at the opening 13d formed at the transmission chamber dividing wall 13c of the middle part case 13a. However, the present invention is not limited thereto. Alternatively, or in addition, the oil passage 12 may be integrally connected to the middle part case 13a at an outer circumferential portion of the opening 13d of the transmission chamber dividing wall 13c, and extending parallel to the shift gear shafts 20 and 21. Further, the end portion 12a of the oil passage 12 may be inserted and supported at the inlet opening 11b of the dividing wall 11a of the final reduction gear unit case 11. Moreover, the oil passage 12 may be integrally formed with a casing member such as the first oil pool 14.

Figure 5:
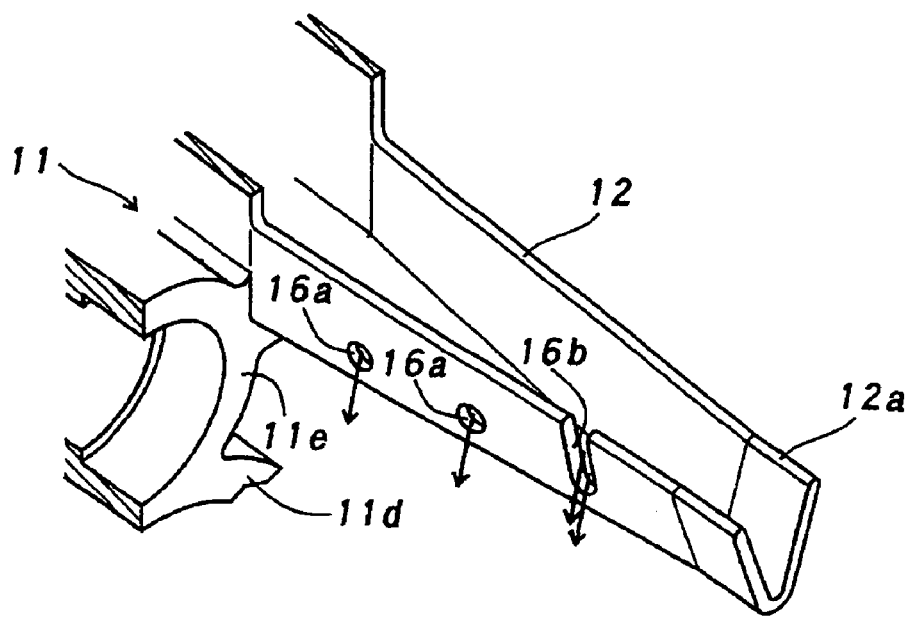
FIG. 5 is an enlarged partial view illustrating an oil passage according to a first variation.
Figure 6:
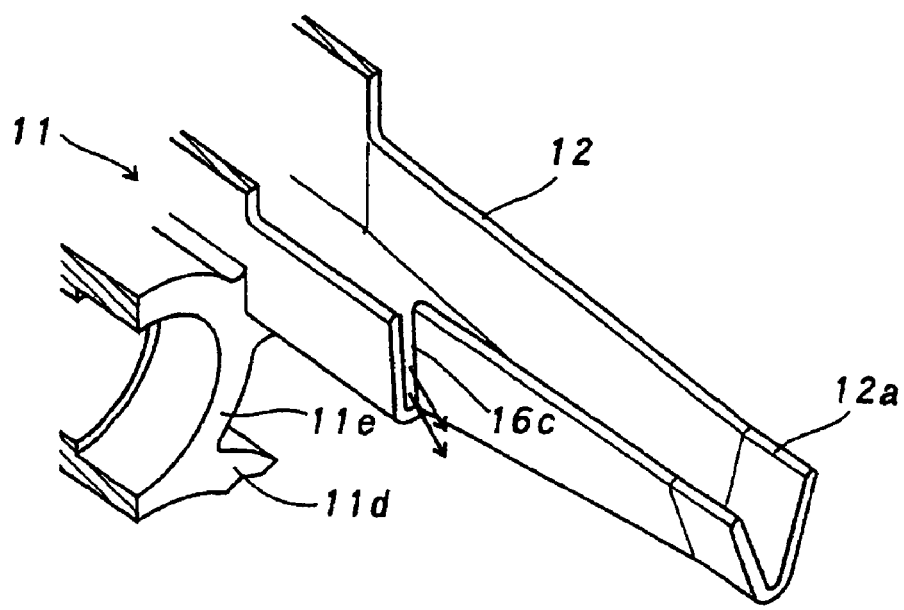
FIG. 6 is an enlarged partial view illustrating an oil passage according to a second variation.

According to the embodiment of the present invention, the lubrication of the meshing surface and the sliding surface of the shift gears 26a, 27a, 26b, and 27b and the selector sleeve 30, in the middle part transmission chamber 10B1, is performed by means of the lubricating oil which is overflowed from the upper edges in the width direction of the oil passage 12 and fallen into the middle part transmission chamber 10B1. Further, the lubrication of the meshing surface and the sliding surface of the shift gears 26a, 27a, 26b, and 27b and the selector sleeve 30 in the middle part transmission chamber 10B1 is performed by means of the lubricating oil which is flowed into the first oil pool 14 and lifted up by means of the lower shift gears 26b and 27b. According to variations of the present invention illustrated in FIGS. 5 and 6, the lubrication of the meshing surface and the sliding surface of the shift gears 26a, 27a, 26b, and 27b and the selector sleeve 30, which are placed in the middle part transmission chamber 10B1, is also performed by means of the lubricating oil which is released from leak portions 16a, 16b, and 16c formed at a side wall of the oil passage 12. According to a first variation illustrated in FIG. 5, the leak portions 16a and 16b are formed at a side wall of the oil passage 12, the side wall being placed at a side of the shift gears 26a, 27a, 26b, and 27b for releasing the lubricating oil. Positions of the leak portions 16a and 16b are defined for supplying the lubricating oil to a part in which a shortage of the lubricating oil is often found. The leak portion is normally formed into a though hole 16a as illustrated in FIG. 5. The leak portion may be formed into a groove shaped notch 16b as illustrated in FIG. 5 for a part in which a good amount of lubricating oil is required. According to a second variation illustrated in FIG. 6, the leak portion is formed into a stepped notch 16c, which is formed by displacing a part of the side wall of the oil passage 12 in a width direction the oil passage 12. With the configuration of a transmission apparatus according to the second variation of the present invention, the lubricating oil can be released along the oil passage 12 in a direction away from the final reduction gear unit case 11.

With the configuration of the transmission apparatus according to the embodiment of the present invention, the oil passage is integrally formed with the casing. The oil passage is provided along an axis line direction of the transmission apparatus for receiving the lubricating oil lifted up by means of the rotational member at the first end portion in the longitudinal direction thereof and supplying the lubricating oil from the second end portion in the longitudinal direction thereof to the part of the casing placed far away from the rotational member. Accordingly, the lubricating oil, lifted up by means of the rotational member, is reliably supplied to the part of the casing placed far away from the rotational member through the oil passage regardless of the operating condition of the transmission apparatus. Therefore, the part of the casing placed far away from the rotational member is well lubricated and the possibility of causing the increase of the abrasion of the meshing surface and the sliding surface or the seizure of the meshing surface and the sliding surface, because of the poor lubrication, can be prevented. Further, because the lubricating oil is supplied to the part of the casing, placed far away from the rotational member, the lubricating oil is circulated in the whole casing, heat is discharged from the whole surface of the casing, and an amount of the combustion heat is thereby increased. Therefore, temperature of the lubricating oil is lowered and the deterioration of the lubricating oil, because of the increase of the oil temperature, can be reduced. In consequence, because the lack of the oil film of the meshing surface and the sliding surface in a condition where the high-load engine torque is applied can be prevented, possibility of causing the early-stage abrasion or seizure of the meshing surface and the sliding surface can be prevented. Further, because the oil passage is integrally formed with the casing, the oil pressure pump is not required. Therefore, structure of the transmission apparatus can be simplified and possibility of causing the increase of the number of components or the increase of the weight can be prevented.

According to the embodiment of the present invention, the transmission apparatus includes the final reduction gear unit at the end portion in the axis line direction thereof. Further, the final reduction gear unit includes the ring gear serving as the rotational member. Because the ring gear is transmitted with the largest torque, the temperature of the lubricating oil, agitated by means of the ring gear with the highest temperature, is raised. With the configuration of the transmission apparatus according to the embodiment of the present invention, because the high-temperature lubricating oil is circulated in the whole casing and heat is discharged from the whole surface of the casing, the lubricating oil is efficiently cooled.

According to the variation of the present invention, the oil passage includes the leak portion for releasing the lubricating oil in the oil passage to desirable parts in the casing. Therefore, by appropriately arranging the leak portion, the desirable parts in the casing can be appropriately lubricated.

According to the embodiment of the present invention, the casing is divided into the final reduction chamber placed at the end portion in the axis line direction for housing the ring gear therein and the transmission chamber for housing plurality of pair of shift gears therein. The transmission chamber is divided into the middle part transmission chamber and the front part transmission chamber by means of the transmission chamber dividing wall. The middle part transmission chamber is placed between the final reduction chamber and the front part transmission chamber. The oil passage receives the lubricating oil at the first end portion in the longitudinal direction thereof and supplies the lubricating oil from the second end portion in the longitudinal direction thereof to the front part transmission chamber. Further, the transmission chamber dividing wall is formed with, at the lower end part thereof, the lower side opening, the dimension of the lower side opening being narrowed down for keeping the level of the lubricating oil, required for lubricating the shift gears placed in the front part transmission chamber, by means of the lubricating oil supplied into the front part transmission chamber through the oil passage. With the configuration of the transmission apparatus according to the embodiment of the present invention, the lubricating oil lifted up by means of the ring gear is reliably supplied into the front part transmission chamber through the oil passage regardless of the operating condition of the transmission apparatus. Therefore, the lubricating oil in the front part transmission chamber is kept at the level required for lubricating the shift gears. Accordingly, the shift gears in the front part transmission chamber placed far away from the ring gear is well lubricated and the possibility of causing the increase of the abrasion of the meshing surface and the sliding surface or the seizure of the meshing surface and the sliding surface because of the poor lubrication can be prevented. Further, because the lubricating oil is circulated in the whole casing from the front part transmission chamber through the middle part transmission chamber, heat is discharged from the whole surface of the casing, and an amount of the combustion heat is thereby increased. Therefore, the temperature of the lubricating oil is lowered and the deterioration of the lubricating oil, because of the increase of oil temperature, can be reduced. In consequence, because the lack of the oil film of the meshing surface and the sliding surface in a condition where the high-load engine torque is applied can be prevented, possibility of causing the early-stage abrasion or seizure of the meshing surface and the sliding surface can be prevented. Further, the lubricating oil in the front part transmission chamber can be completely drained at the time of replacement of the lubricating oil.

With the configuration of the longitudinal-type transaxle, incorporating the final reduction gear unit at an end portion in an axis line direction thereof, the rotational member of the final reduction gear unit is provided at an end portion of the casing. Therefore, it may occasionally be difficult to reliably supply the lubricating oil to all components in the casing depending on the operating condition of the transmission apparatus. However, according to the variation of the present invention, the lubricating oil lifted up by means of the rotational member can normally be supplied to the part of the casing placed far away from the rotational member in a reliable manner. Therefore, the possibility of causing the increase of the abrasion of the meshing surface and the sliding surface or the seizure of the meshing surface and the sliding surface, because of the poor lubrication, can be prevented. Further, deterioration of the lubricating oil, because of the increase of the oil temperature, can be reduced.

The principles, preferred embodiment and mode of operation of the present invention, have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A transmission apparatus comprising:
    a casing provided with shafts therein;
    a rotational member positioned in the casing at an end portion in an axial direction of the shafts, the rotational member being configured to rotate and to lift up a lubricating oil in a bottom portion of the casing so as to supply the lubricating oil to a part that is different from the end portion inside the casing;
    an oil passage provided along the axis line direction of the shafts, the oil passage configured to receive the lubricating oil lifted up by the rotational member at a first end portion in a longitudinal direction of the oil passage and to supply the lubricating oil through a second end portion in the longitudinal direction of the oil passage to a part inside the casing placed far away from the rotational member, the oil passage being integrally formed with the casing; and
    a final reduction gear unit provided at the end portion in the axis direction of the shafts and including a ring gear as the rotational member, wherein
    the casing is divided into a final reduction chamber placed at the end portion in the axis line direction of the shafts and housing the ring gear therein and into a transmission chamber, in which plural pairs of shift gears are housed therein,
    the transmission chamber is divided into a middle part transmission chamber and a front part transmission chamber by a transmission chamber dividing wall, the middle part transmission chamber being placed between the front part transmission chamber and the final reduction chamber,
    the oil passage receives the lubricating oil at the first end portion in the longitudinal direction of the oil passage and supplies the lubricating oil through the second end portion in the longitudinal direction of the oil passage to the front part transmission chamber, and
    the transmission chamber dividing wall is formed with a lower side opening at a lower end portion thereof, a dimension of the lower side opening being narrowed down for keeping an oil level of the lubricating oil required for lubricating the shift gears placed in the front part transmission chamber by the lubricating oil supplied into the front part transmission chamber from the oil passage.

2. The transmission apparatus according to claim 1, wherein the casing is applicable for a longitudinal-type transaxle.

3. A transmission apparatus comprising:
    a casing provided with shafts therein;
    a rotational member positioned in the casing at an end portion in an axial direction of the shafts, the rotational member being configured to rotate and to lift up a lubricating oil in a bottom portion of the casing so as to supply the lubricating oil to a part that is different from the end portion inside the casing; and
    an oil passage provided along the axis line direction of the shafts, the oil passage configured to receive the lubricating oil lifted up by the rotational member at a first end portion in a longitudinal direction of the oil passage and to supply the lubricating oil through a second end portion in the longitudinal direction of the oil passage to a part inside the casing placed far away from the rotational member, the oil passage being integrally formed with the casing, wherein the oil passage formed in the casing includes at least one leak portion for releasing the lubricating oil in the oil passage to a desirable part in the casing, the casing is divided into a final reduction chamber placed at the end portion in the axis line direction of the shafts and housing the ring gear therein and into a transmission chamber, in which plural pairs of shift gears are housed therein, the transmission chamber is divided into a middle part transmission chamber and a front part transmission chamber by a transmission chamber dividing wall, the middle part transmission chamber being placed between the front part transmission chamber and the final reduction chamber, the oil passage receives the lubricating oil at the first end portion in the longitudinal direction of the oil passage and supplies the lubricating oil through the second end portion in the longitudinal direction of the oil passage to the front part transmission chamber, and the transmission chamber dividing wall is formed with a lower side opening at a lower end portion thereof, a dimension of the lower side opening being narrowed down for keeping an oil level of the lubricating oil required for lubricating the shift gears placed in the front part transmission chamber by the lubricating oil supplied into the front part transmission chamber from the oil passage.

4. The transmission apparatus according to claim 3, wherein the casing is applicable for a longitudinal-type transaxle.

5. A transmission apparatus comprising:

a casing provided with shafts therein;

a rotational member positioned in the casing at an end portion in an axial direction of the shafts, the rotational member being configured to rotate and to lift up a lubricating oil in a bottom portion of the casing so as to supply the lubricating oil to a part that is different from the end portion inside the casing;

an oil passage provided along the axis line direction of the shafts, the oil passage configured to receive the lubricating oil lifted up by the rotational member at a first end portion in a longitudinal direction of the oil passage and to supply the lubricating oil through a second end portion in the longitudinal direction of the oil passage to a part inside the casing placed far away from the rotational member, the oil passage being integrally formed with the casing; and a final reduction gear unit provided at the end portion in the axis direction of the shafts and including a ring gear as the rotational member, wherein the oil passage formed in the casing includes at least one leak portion for releasing the lubricating oil in the oil passage to a desirable part in the casing, the casing is divided into a final reduction chamber placed at the end portion in the axis line direction of the shafts and housing the ring gear therein and into a transmission chamber, in which plural pairs of shift gears are housed therein, the transmission chamber is divided into a middle part transmission chamber and a front part transmission chamber by a transmission chamber dividing wall, the middle part transmission chamber being placed between the front part transmission chamber and the final reduction chamber, the oil passage receives the lubricating oil at the first end portion in the longitudinal direction of the oil passage and supplies the lubricating oil through the second end portion in the longitudinal direction of the oil passage to the front part transmission chamber, and the transmission chamber dividing wall is formed with a lower side opening at a lower end portion thereof, a dimension of the lower side opening being narrowed down for keeping an oil level of the lubricating oil required for lubricating the shift gears placed in the front part transmission chamber by the lubricating oil supplied into the front part transmission chamber from the oil passage.

6. The transmission apparatus according to claim 5, wherein the casing is applicable for a longitudinal-type transaxle.

* * * * *